(12) United States Patent
Easter et al.

(10) Patent No.: US 11,138,551 B2
(45) Date of Patent: Oct. 5, 2021

(54) BUNDLED APPLICATION FOR LOAD MANAGEMENT SYSTEM

(71) Applicant: Walmart Apollo, LLC, Bentonville, AR (US)

(72) Inventors: Jimmy Easter, Bentonville, AR (US); Jason Kyle Wellington, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 228 days.

(21) Appl. No.: 16/426,814

(22) Filed: May 30, 2019

(65) Prior Publication Data

US 2019/0378087 A1 Dec. 12, 2019

Related U.S. Application Data

(60) Provisional application No. 62/677,822, filed on May 30, 2018.

(51) Int. Cl.

| | |
|---|---|
| *G06Q 10/08* | (2012.01) |
| *G06F 9/451* | (2018.01) |
| *G06F 16/245* | (2019.01) |
| *H04L 29/08* | (2006.01) |
| *G06F 16/29* | (2019.01) |
| *G06F 16/27* | (2019.01) |

(52) U.S. Cl.
CPC ......... *G06Q 10/0838* (2013.01); *G06F 9/451* (2018.02); *G06F 16/245* (2019.01); *G06F 16/27* (2019.01); *G06F 16/29* (2019.01); *H04L 67/24* (2013.01); *H04L 67/306* (2013.01)

(58) Field of Classification Search
CPC ..... G06Q 10/0838; G06F 9/451; G06F 16/27; G06F 16/245; G06F 16/29; H04L 67/24; H04L 67/306
USPC ........................................................ 705/341
See application file for complete search history.

(56) References Cited

U.S. PATENT DOCUMENTS

| | | |
|---|---|---|
| 9,223,588 B2 | 12/2015 | Adams et al. |
| 9,442,778 B2 | 9/2016 | Desai et al. |
| 9,473,485 B2 | 10/2016 | Kendall |
| 9,514,406 B2 | 12/2016 | Boyer |
| 9,665,381 B2 | 5/2017 | Suggs et al. |
| 10,970,670 B2 * | 4/2021 | Baldwin .............. G06K 7/1413 |
| 2012/0246039 A1 | 9/2012 | Fain et al. |
| 2014/0035723 A1 | 2/2014 | Alfar et al. |
| 2014/0089947 A1 | 3/2014 | Han et al. |

* cited by examiner

*Primary Examiner* — William D Titcomb
(74) *Attorney, Agent, or Firm* — Fitch, Even, Tabin & Flannery LLP (57) ABSTRACT

Load management systems and methods are described. A load management system comprises a database storing load information, a mobile application associated with a user account and executable on a mobile device. The mobile application includes a main application and independently executable sub-applications corresponding to workflow progresses in the distribution center. The mobile application when executed, accesses the sub-applications in response to a user logging in to the main mobile application. The sub-applications inherit credentials from the main application and communicate with each other in response to inheriting the credentials.

22 Claims, 9 Drawing Sheets

BUNDLED APPLICATION FOR LOAD MANAGEMENT SYSTEM

RELATED APPLICATION

This application claims the benefit of, and priority to, U.S. Provisional Patent Application No. 62/677,822, filed May 30, 2018, the content of which is incorporated herein by reference in its entirety.

BACKGROUND

In a distribution center, a truck driver needs to supply paperwork to the distribution center before dropping off the freight they are moving. These processes, for example, gate-in, gate-out, proof of delivery, etc., can be time consuming and inaccurate.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Described in detail herein is a load management system including an application management system for a distribution center. Load information related to loads destined for the distribution center can be stored in a database. The load information can include an identification associated with each of the loads. The system can include a mobile application associated with a user account and the mobile application can executable on a mobile device to implementation the application management system. The mobile application can include a main application and independently executable sub-applications corresponding to workflow progresses in the distribution center. The mobile device executes the mobile application to access the sub-applications in response to a user logging in to the main mobile application associated with the corresponding user account. Each of the main application and the sub-applications can be separate and distinct executables and can be executed as separate and distinct instances. In response to execution of the main application, the mobile device renders, on a display of the mobile device and within a graphical user interface of the main application, selectable icons corresponding to the sub-applications on the mobile device. The sub-applications can inherit credentials from the main application and communicate with each other in response to inheriting the credentials.

The mobile device can activate a first sub-application in response to the user selecting a first one of the selectable icons corresponding to the first sub-application. In response to execution of the first sub-application, the mobile device can acquire at least one of the identifications of the loads, query the database with the acquired at least one of the identifications of the loads for the load information related to a specified load, receive the queried load information from the database, update the load information based on information of load documentation, and generate a machine-readable representation corresponding to the at least one of the identifications of the load.

The mobile device can activate a second sub-application in response to the user selecting a second one of the selectable icons corresponding to the second sub-application. In response to execution of the second sub-application, the mobile device can acquire the machine-readable representation generated by the first sub-application, query the database, with the machine-readable representation, for the load information related to the load, receive the queried load information from the database, acquire pallet information, and update the load information based on the pallet information.

The mobile application can be programmed to handle driver processes at the distribution center to automate and streamline driver interactions at the distribution center. The mobile application can be a bundle for individual and distinct driver tools and can provide a platform to modify and standardize workflow. As described herein, the mobile application houses a number of sub-applications which the driver may use as he/she enters the distribution center, loads or unloads cargo and finally departs from the distribution center. The mobile application can allow a user to register using a federated login, for example, from Yahoo, Vudu, Facebook, etc. The mobile application can be downloaded and installed on the mobile device as a bundle including the main application and the sub-applications.

The load management system can be used with a scheduler database, user mobile devices, and other distribution center systems to facilitate an expedited and accurate check-in process for trailer drivers and the freight on the trailers, and to direct autonomous yard vehicles. The load management system can receive load information generated by the scheduler and compile the information such that the load information can be shared electronically when the driver arrives at the distribution center. The driver also has the option of inputting selected information into the mobile app when the driver is between the freight pickup location and the DC, which can eliminate the need for an asset protection (AP) associate at the distribution center to manually enter the information into a yard management system, and eliminate paperwork from the processes in the distribution center to reduce the interactiontime at the truck gate of the distribution center and to reduce the potential for human error. The load information can be sent to the yard management system (YMS) and YMS can send instruction information to the driver regarding where to load or unload the freight in the distribution center.

Accordingly, systems and methods provided herein can make the processes in a distribution center, such as gate-in, proof-of delivery, gate-out, etc., faster and with higher accuracy as a driver can be guided to the correct location by the mobile application once the driver enters the yard area of a distribution center.

Figure 1:
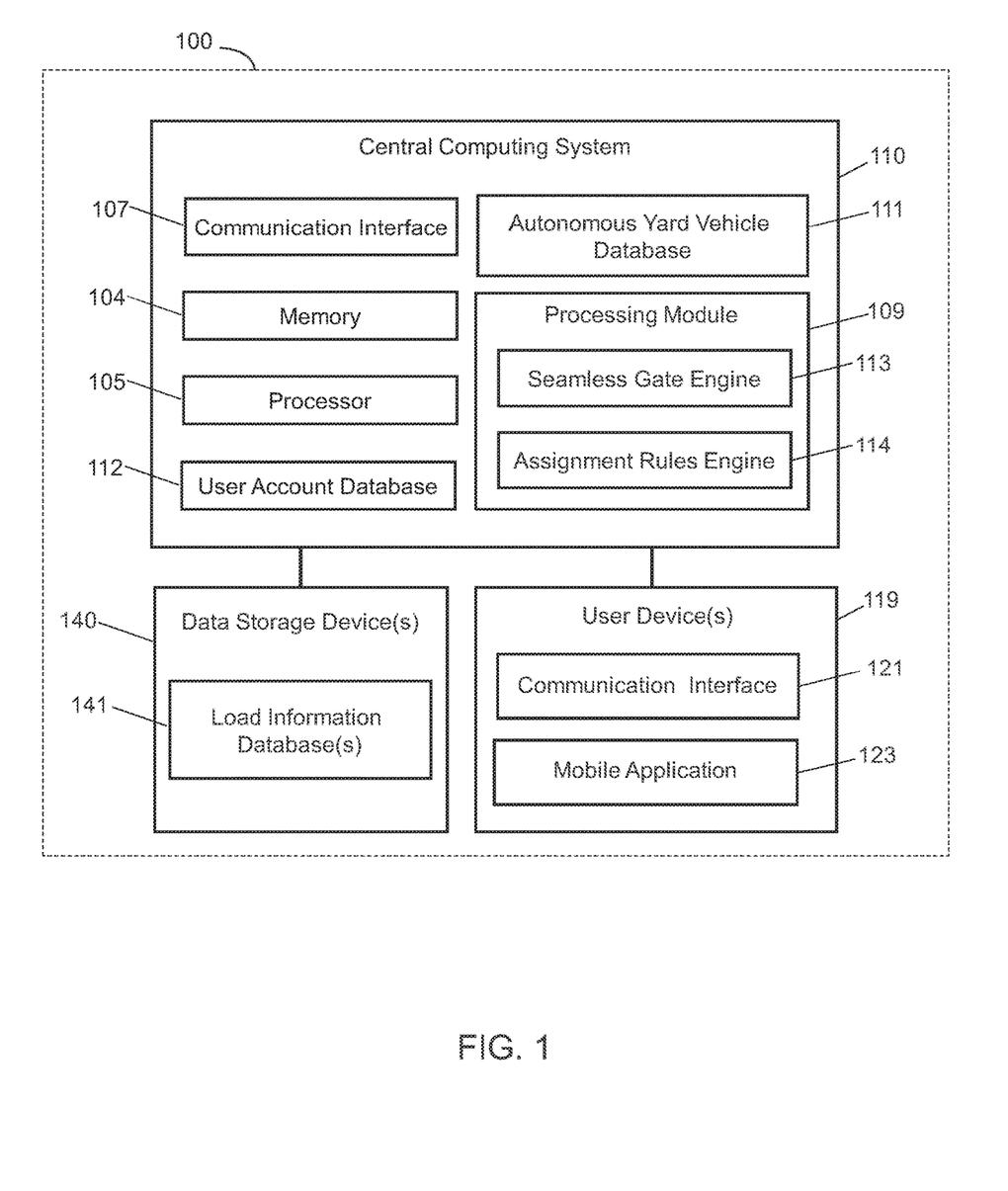
FIG. 1 is a block diagram showing a load management system according to various embodiments of the present disclosure.

Referring now to FIG. 1, an exemplary load management system 100 includes a computing system 110, user device(s) 119, and data storages device(s) 140. The computing system 110 includes memory 104, a processor 105 and communication interface 107. In some embodiments, the computing system 110 is configured to execute a processing module 109 and also includes, or is able to access, an autonomous yard vehicle database 111 and a user account database 112.

The autonomous yard vehicle database 111 can include information associated with the autonomous yard vehicles in the distribution center, such as type of the autonomous yard vehicle, current location of each autonomous yard vehicle, work schedule of each autonomous yard vehicle.

The user account database 112 includes information associated with user accounts, such as the user's profile, the user's previous delivery history, etc.

Processing module 109 includes a seamless gate engine 113 and an assignment rules engine 114. The seamless gate engine 113 executes the processes, such as gate-in, gate-out, proof-of-delivery, etc., when the users or drivers arrive at the distribution center. In one non-limiting example, the assignment rules engine 114 assigns the autonomous vehicles in the distribution center to the cargo trailers based on particular rules and load information received from the mobile application. For example, the assignment rules engine 114 can determine how to assign the autonomous tractors to the trailers based upon the received freight information, predetermined rules including locations of the autonomous vehicles and the trailer, priority of movement, freight requirements for the assigned door, etc. In another non-limiting example, the assignment rules engine 114 assigns, via the mobile application executing on the mobile device of the driver, the driver a waiting area, dock or door to which the load should be delivered based on particular rules and load information received from the mobile application (e.g., freight information, priority of movement, freight requirements for the assigned door, etc.).

Communication interface 107, in accordance with various embodiments can include, but is not limited to, a radio frequency (RF) receiver, RF transceiver, NFC device, a built-in network adapter, network interface card, PCMCIA network card, card bus network adapter, wireless network adapter, USB network adapter, modem or any other device suitable for interfacing with any type of network capable of communication and performing the operations described herein. Processor 105, in accordance with various embodiments can include, for example, but not limited to, a microchip, a processor (e.g., a central processing unit, a graphical processing unit), a microprocessor, a special purpose processor, an application specific integrated circuit, a microcontroller, a field programmable gate array, any other suitable processor, or combinations thereof. The computing system 110 can also include, memory 104 such as but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

The data storage device(s) 140 can hold load information database(s) 141 containing load information related to each freight delivery. The load information includes, for example, delivery number, purchase order (PO) number, progressive number (PRO) number, bill of lading (BOL) number, pickup date, freight information, etc.

User device 119 includes communication interface 121 for communicating with the computing system 110 and executes a mobile application 123. User device 119 may be smartphone, tablet or other mobile device equipped with a processor, communication interface 121 and a bundled mobile application 123 that includes a bundle having a main application and sub-applications, each of which are distinct and separate applications having separate and distinct executable files. The bundled mobile application 123 can generate a user interface for accepting user input and is configured to control an integrated data acquisition device such as, but not limited to, an active short-range communication device, such as a NFC or RFID reader, to acquire NFC/RFID tag information, and, in an exemplary embodiment, a camera on a user device to capture images of items. For example, the mobile application 123 can acquire delivery number input by the users and generate a machine-readable representation, such as a barcode, based on the load information related to the acquired delivery number.

FIG. 2 is a flow diagram illustrating a process for managing the loads performed by the load management system in a distribution center according to an exemplary embodiment of the present disclosure. At step 201, the user or driver logs in to a main application of the bundled mobile application using a mobile device. The user can log in to the main application using a federated login. The main application can be used to launch one or more of the sub-applications. Each of the main application and the sub-applications can be separate and distinct executables that are executed as separate and distinct instances on the mobile device. For example, the sub-applications can include distinct and independent applications for a gate-in process, a gate-out process, a proof-of-delivery (POD) process, as well as other processes.

Figure 2A:
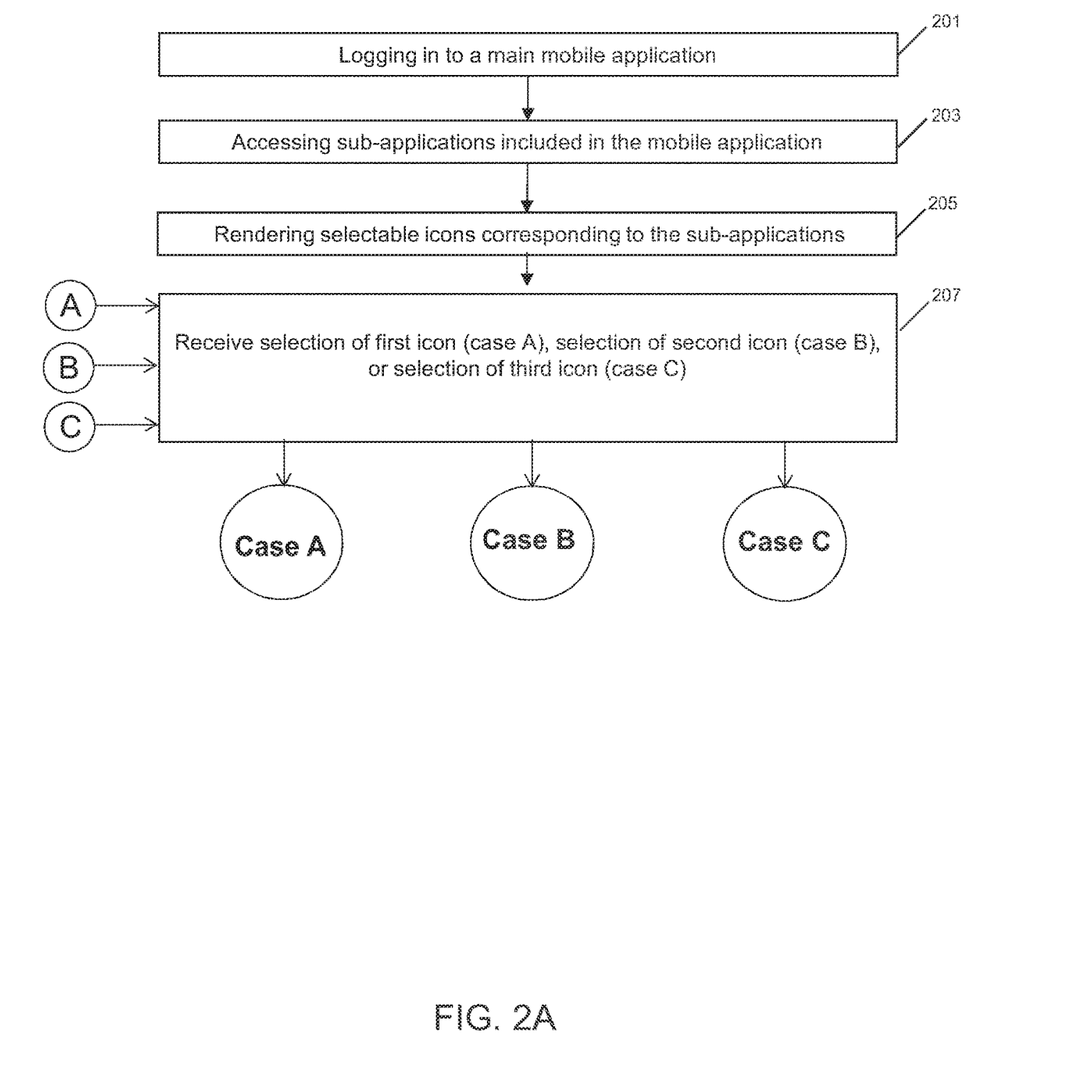
FIGS. 2A-2D are flow diagrams illustrating a load managing process performed by the load management system in a distribution center according to various embodiments of the present disclosure.

In response to the user logging into the main application, the sub-applications can be accessed via the mobile device at step 203. The sub-applications inherit credentials from the main application and communicate with each other in response to inheriting the credentials. When the main application is terminated, any of instances of the sub-applications that are being executed on the mobile device are also terminated accordingly. The main application and the sub-applications share the load information and the pallet information related to the load, and share the user profile associated with the user account. The load information can include driver information related to a driver delivering the cargo trailer to the distribution center, a vehicle transporting the cargo trailer, a freight-type associated with each of the plurality of loads, estimated time of arrival, trailer number, Standard Carrier Alpha Code (SCAC), seal number, and freight type. At step 205, selectable icons corresponding to the sub-applications, such as a first icon corresponding to gate-in sub-application, a second icon corresponding to proof-of delivery sub-application, a third icon corresponding to gate-out sub-application, etc., are rendered on a display of the mobile device and within a graphical user interface of the main application. At step 207, in response to the user selecting the first, second, or the third icon, the user's selection is received, and the gate-in, proof-of delivery, or gate-out sub-application can be launched or activated, respectively.

If the user selects the first icon at step 207, in case A, at step 209, the first sub-application, for example, a gate-in application, can be launched or activated in response to the user's selection. The launching or activation of the first sub-application results in execution of an instance of the first sub-application by the mobile device in which the instance inherits credentials and profile information from the instance of the main application that is being executed. At step 211, the gate-in application acquires at least one of the identifications of the freight load. The identifications of the load include, for example, a delivery number, a load number, a purchase order (PO) number, and a bill of lading (BOL) number. The driver can enter the delivery number into the gate-in application by inputting the delivery number or taking a picture of the delivery number that can be identified by the gate-in application.

At step 213, the gate-in application queries the database with the acquired identification of the loads, for the load information related to a specified load. At step 215 the gate-in application receives the queried load information from the database, and then updates the load information based on information of load documentation at step 217. At step 219 the gate-in application generates a machine-readable representation corresponding to the identifications of the load, such as a barcode.

Then at point A, if the user terminates the gate-in sub-application, the process can go back to step 207 to launch or activate the other sub-applications in response to the user selecting other icons. Alternatively, without terminating the gate-in sub-application, the user can launch or activate the proof-of-delivery or gate-out sub-application by selecting the corresponding icon, respectively.

Figure 2B:
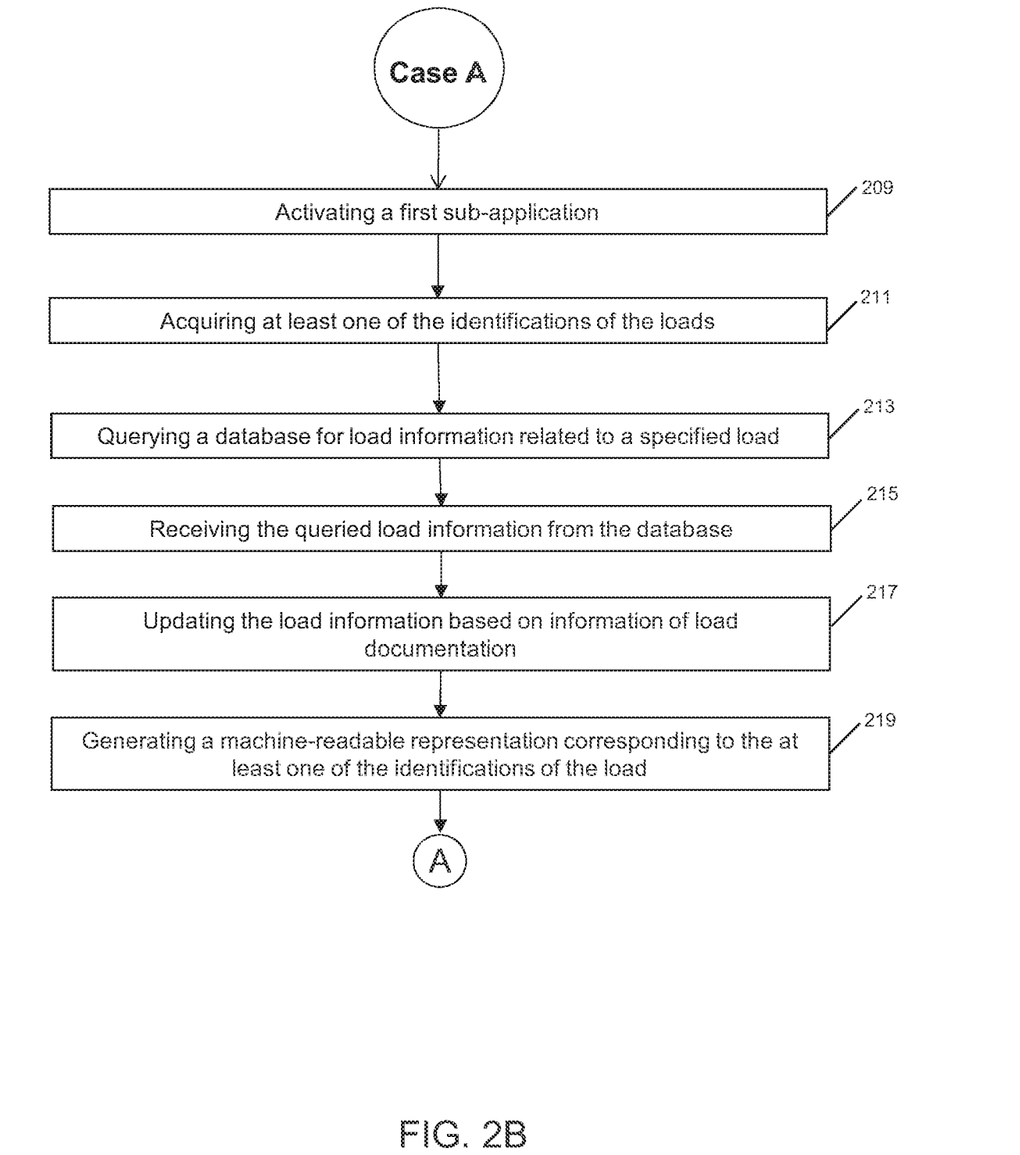

If the user selects the second icon at step 207, in case B, at step 221, the second sub-application, for example, a proof-of-delivery (POD) application, can be launched or activated in response to the user's selection. The launching or activation of the second sub-application results in execution of an instance of the second sub-application by the mobile device in which the instance inherits credentials and profile information from the instance of the main application that is being executed and can inherit data or information from the instance of the first sub-application if the instance of the first sub-application is still being executed (e.g., has not been terminated).

At step 223, the proof-of-delivery application acquires the machine-readable representation generated by the first sub-application, i.e., the gate-in application. At step 225, the proof-of-delivery application queries the database with the acquired machine-readable representation for the load information. Then at step 227 the proof-of-delivery application receives the queried load information from the database, and at step 229 pallet information of the load is acquired. At step 231, based on the acquired pallet information, the load information is updated in load information databases of the load management system.

Figure 2C:
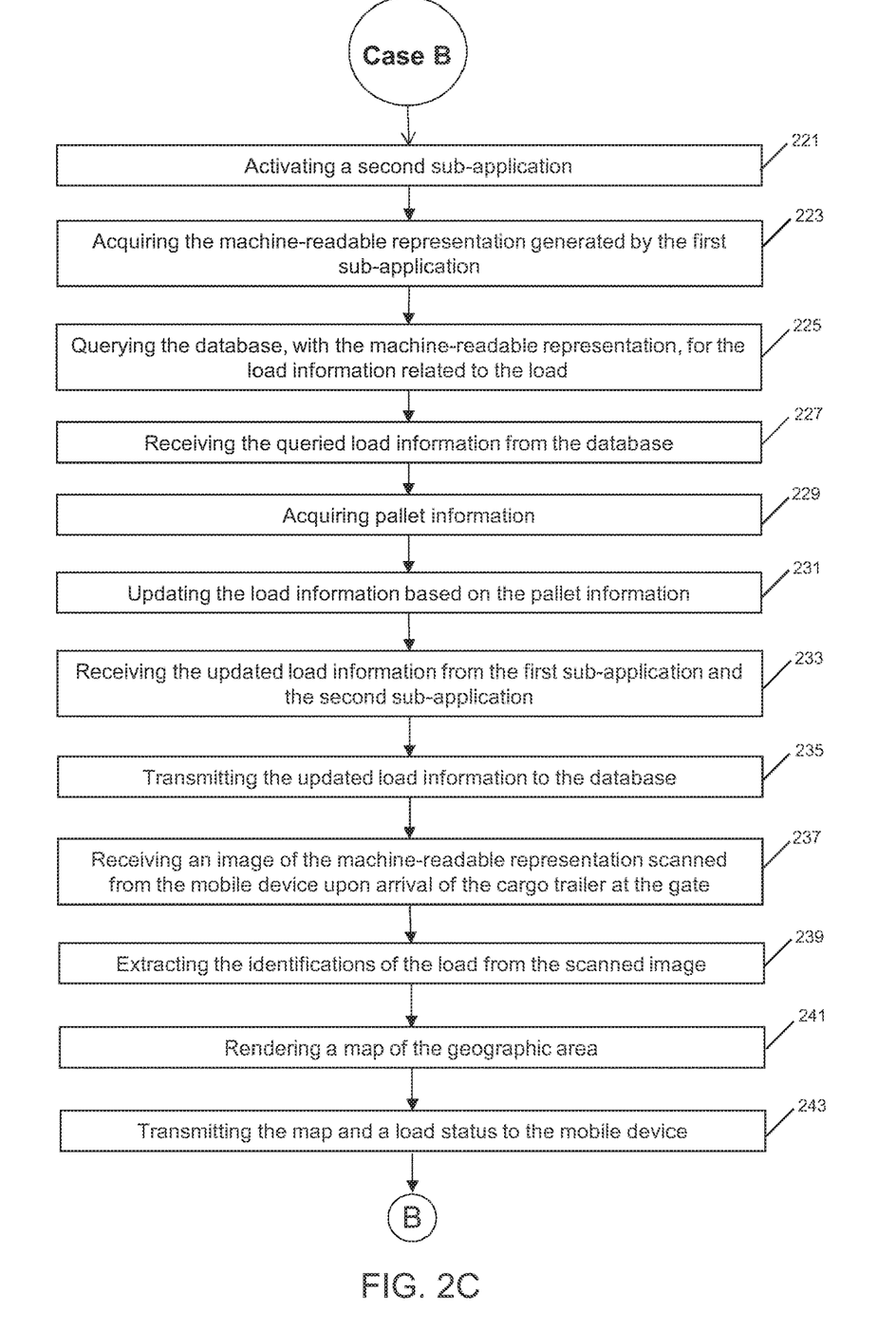

At step 233 a computing system of the load management system receives the updated load information from the gate-in application and the proof-of-delivery application. At step 235 the updated load information can be transmitted to the database. At step 237 the computing system of the load management system receives an image of the machine-readable representation scanned from the mobile device by the client device upon arrival of the cargo trailer at the gate. At step 239, the at least one of the identifications of the load can be extracted from the scanned image. Then at step 241, the computing system of the load management system renders a map of the geographic area including a transfer location at which the cargo trailer is to be dropped off after passing through the gate, and transmits the map and a load status to the mobile device associated with the user account at step 243, and the mobile app can present a yard map. The load status can include a real-time status of unloading freight indicating estimated time to complete unloading.

Then at point B, if the user terminates the proof-of-delivery sub-application, the process can go back to step 207 to launch or activate the other sub-applications in response to the user selecting other icons. Alternatively, without terminating the proof-of-delivery sub-application, the user can launch or activate the gate-out or gate-in sub-application by selecting the corresponding icon, respectively.

Figure 2D:
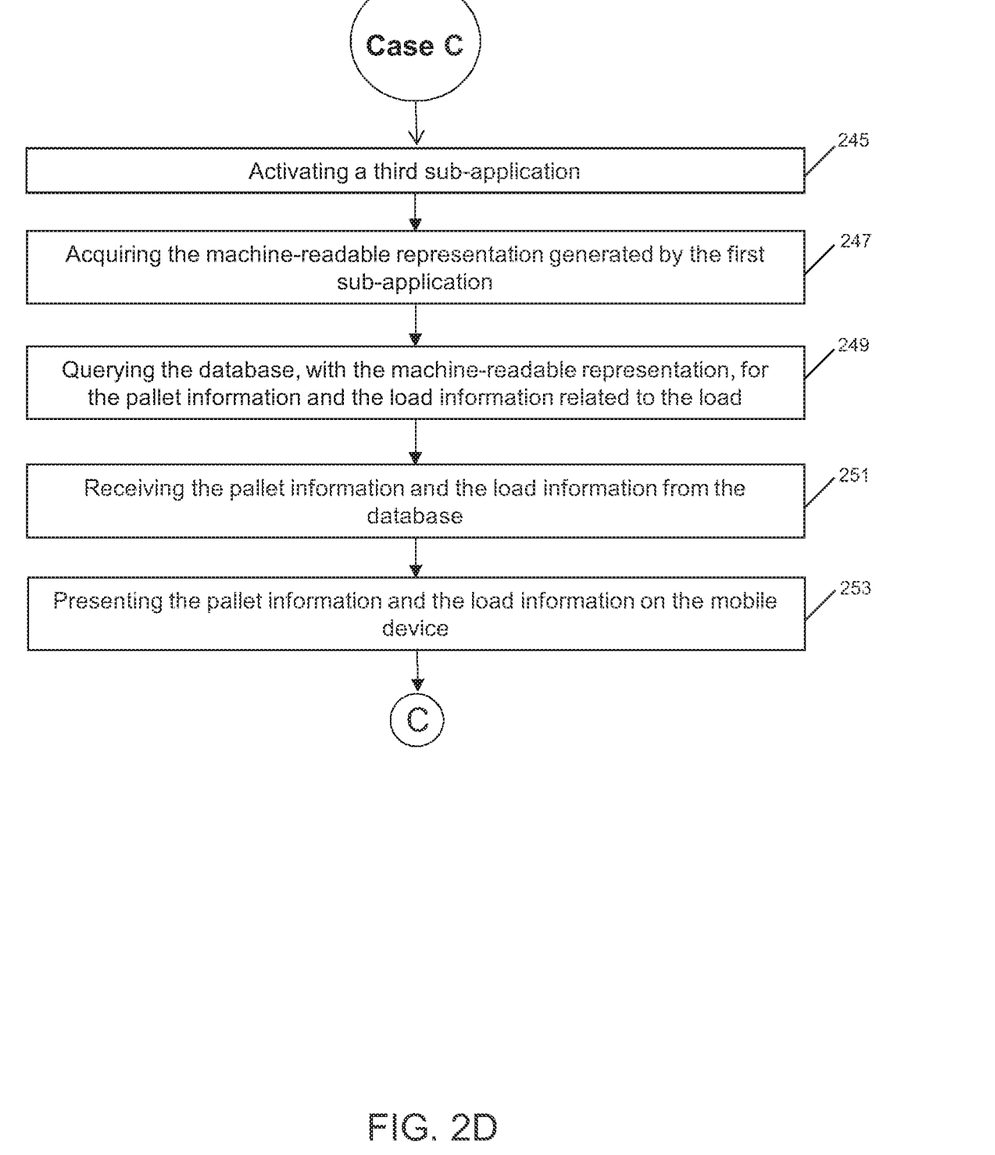

When the load tasks are completed, such as after the freight is loaded or unloaded, the gate-out process is needed before the user or driver leaves the distribution center. For example, the driver can pull the trailer to the truck gate of the distribution center and stops for the asset protection (AP) associate verification. If the user selects the third icon at step 207, in case C, at step 245, the third sub-application, for example the gate-out application, can be launched or activated in response to the user's selection. The launching or activation of the third sub-application results in execution of an instance of the third sub-application by the mobile device in which the instance inherits credentials and profile information from the instance of the main application that is being executed and can inherit data or information from the instances of the first and/or second sub-applications if the instances of the first and/or second sub-applications are still being executed (e.g., has not been terminated). At step 247, the gate-out application acquires the machine-readable representation generated by the first sub-application, i.e., the gate-in application. At step 249, the gate-out application queries the database with the machine-readable representation for the pallet information and the load information related to the freight load. Then the gate-out application receives the pallet information and the load information from the database at step 251, and presents the pallet information and the load information on the mobile device at step 253.

In one embodiment, the main mobile application provides security shell for the sub-applications based on principles of inherency and the federated login.

In another embodiment, the driver can obtain pallet information by using the mobile device to capture images of each pallet or scanning pallet labels, and the load management system can verify the pallet information based on the captured or scanned images of the pallets during the gate-in or gate-out process.

Figure 3A:
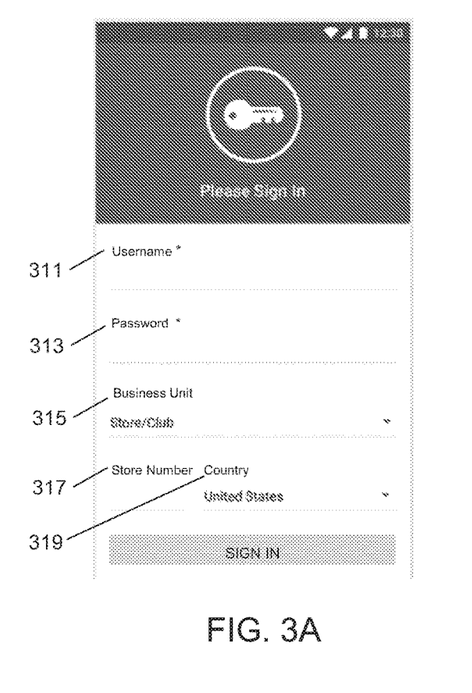
FIGS. 3A-3D are graphical user interfaces (GUIs) of a mobile application of the load management system according to an exemplary embodiment of the present disclosure.
Figure 3B:
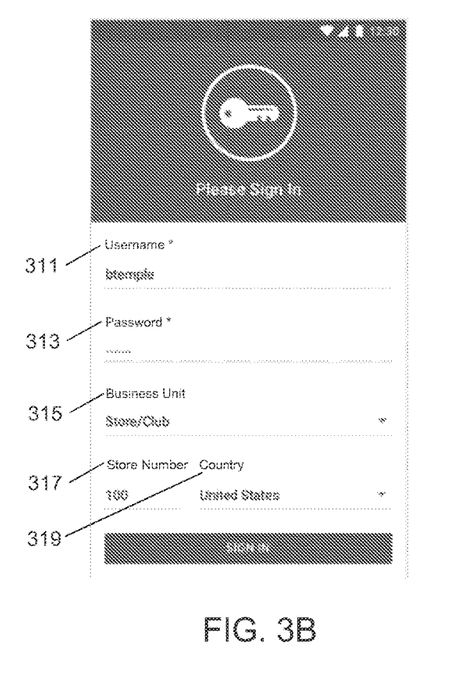
Figure 3C:
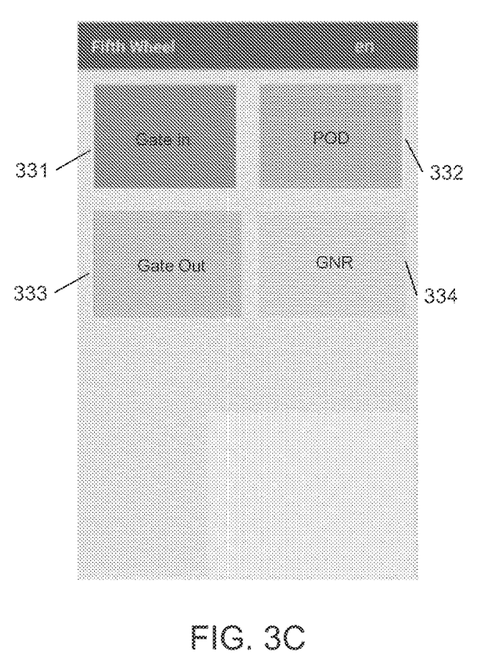

FIGS. 3A-3D are exemplary graphical user interfaces (GUIs) of a mobile application executed on a mobile device of the load management system according to the present disclosure. As shown in FIGS. 3A-3B, after the user or the driver launches the main mobile application, the user can log in his/her account by entering username 311, password 313, business unit 315, store number 317, and country 319. After logging in to the main application, as shown in FIG. 3C, the user can select the sub-application corresponding to the needed workflow, such as gate-in application 331, proof-of-delivery (POD) application 332, gate-out application 333, and good neighbor rewards (GNR) application 334.

Figure 3D:
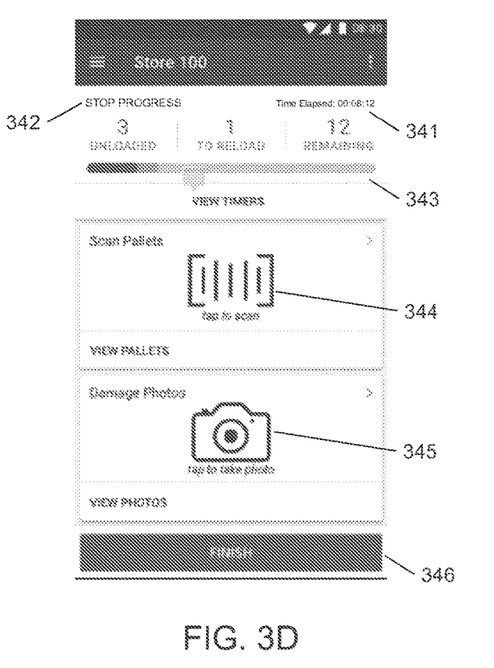

FIG. 3D shows a GUI of the POD sub-application 332 indicating stop progress. In FIG. 3D, timer 341 indicates the time elapsed for the current load task. Stop progress 342 indicates that in the current task, there are three (3) unloaded pallets, one (1) pallet to reload, and twelve (12) remaining pallets. A progress bar 343 shows the percentage of completion of the task using different colors. The user can tap the region 344 to scan the machine-readable representation of each pallet, such as barcode, to acquire the related pallet information. When the pallet is damaged, the user can tap the region 345 to take photos of the damaged pallets. The user can click the "FINISH" button 346 to submit the uploaded barcode or photos.

Figure 4A:
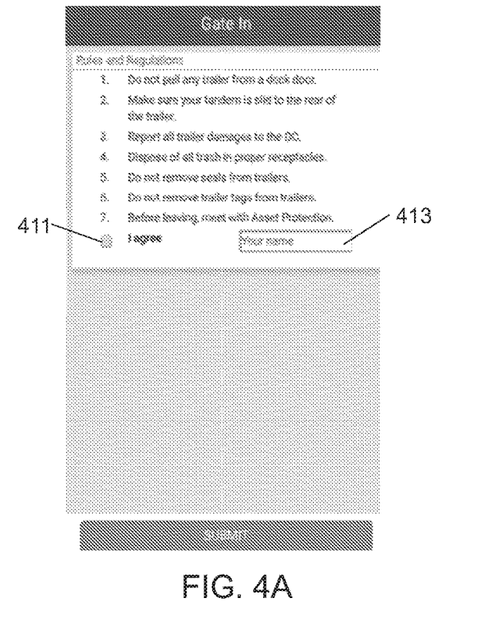
FIGS. 4A-4D are graphical user interfaces (GUIs) of a gate-in sub-application of a mobile application of the load management system according to an exemplary embodiment of the present disclosure.

FIGS. 4A-4D are exemplary graphical user interfaces (GUIs) of a gate-in sub-application of the main application executed on the mobile device of the load management system according to the present disclosure. FIG. 4A shows a GUI of acknowledgement of rules and regulations when the user selects gate-in process 331. By selecting the checkbox 411 and entering the user's name at name box 413, the user acknowledges and agrees to the rules and regulations shown on the GUI screen in FIG. 4A. Therefore, the load management system transmits safety requirement to the mobile device and tracks safety review of the user associated with the mobile device.

Figure 4B:
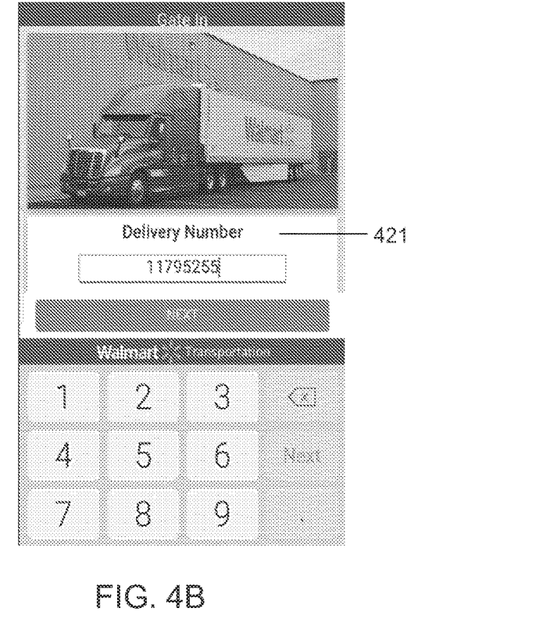

Then as shown in FIG. 4B, the user can enter and submit delivery number or load number 421 provided by the freight carrier. Alternatively, the user can use the smartphone to photograph the delivery number or load number from the paper bill of lading (BOL) provided by the freight carrier. According to the delivery number submitted by the user, the mobile app can acquire the load information related to the delivery number from databases provided by the freight carrier.

Figure 4C:
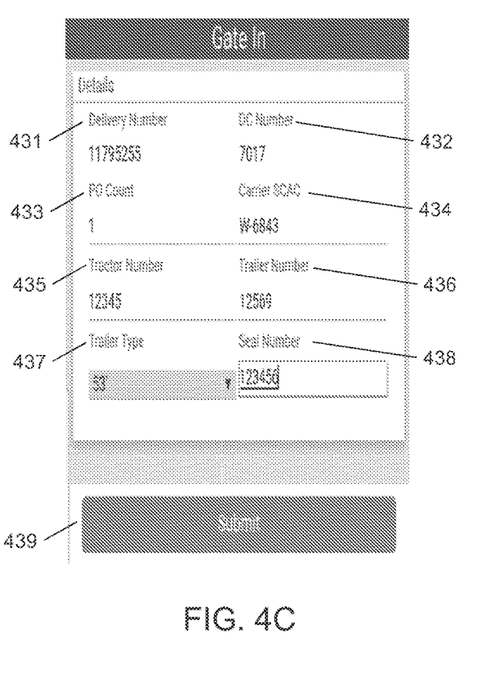
Figure 4D:
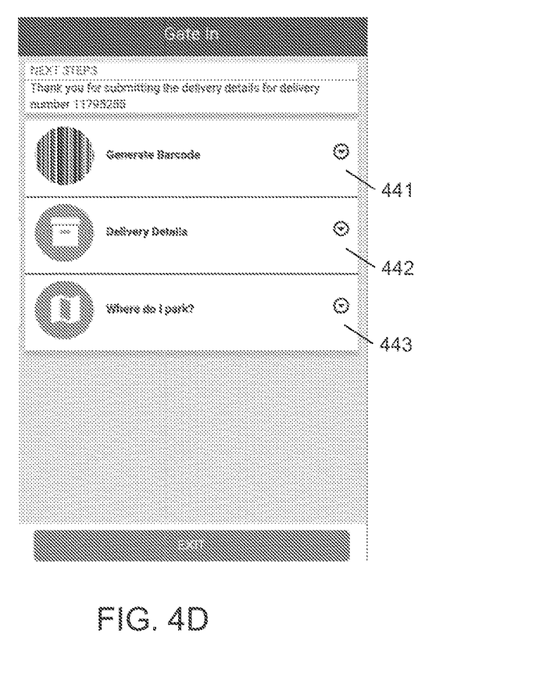

Then in the GUI shown in FIG. 4C, load information can be acquired from the database provided by the freight carrier. Alternatively, the additional load information can be entered by the user. As shown in FIG. 4C, the load information includes, for example, delivery number 431, distribution center (DC) number 432, purchase order (PO) count 433, carrier standard carrier alpha code (SCAC) 434, tractor number 435, trailer number 436, trailer type 437, and seal number 438. The user can click the "Submit" button 439 to submit the load information. Then FIG. 4D shows that the load information has been submitted. Then the user can click the "Generate Barcode" button 441 to generate a barcode related to the delivery number. The delivery details can be presented if the user clicks the "Delivery Details" button 442. If the user clicks the "Where do I park?" button 443, a map of the distribution center including a location at which the user parks the truck can be presented on the screen. The map can also provide a real-time location of the mobile device relative to the location using the mobile devices GPS receiver.

Figure 5:
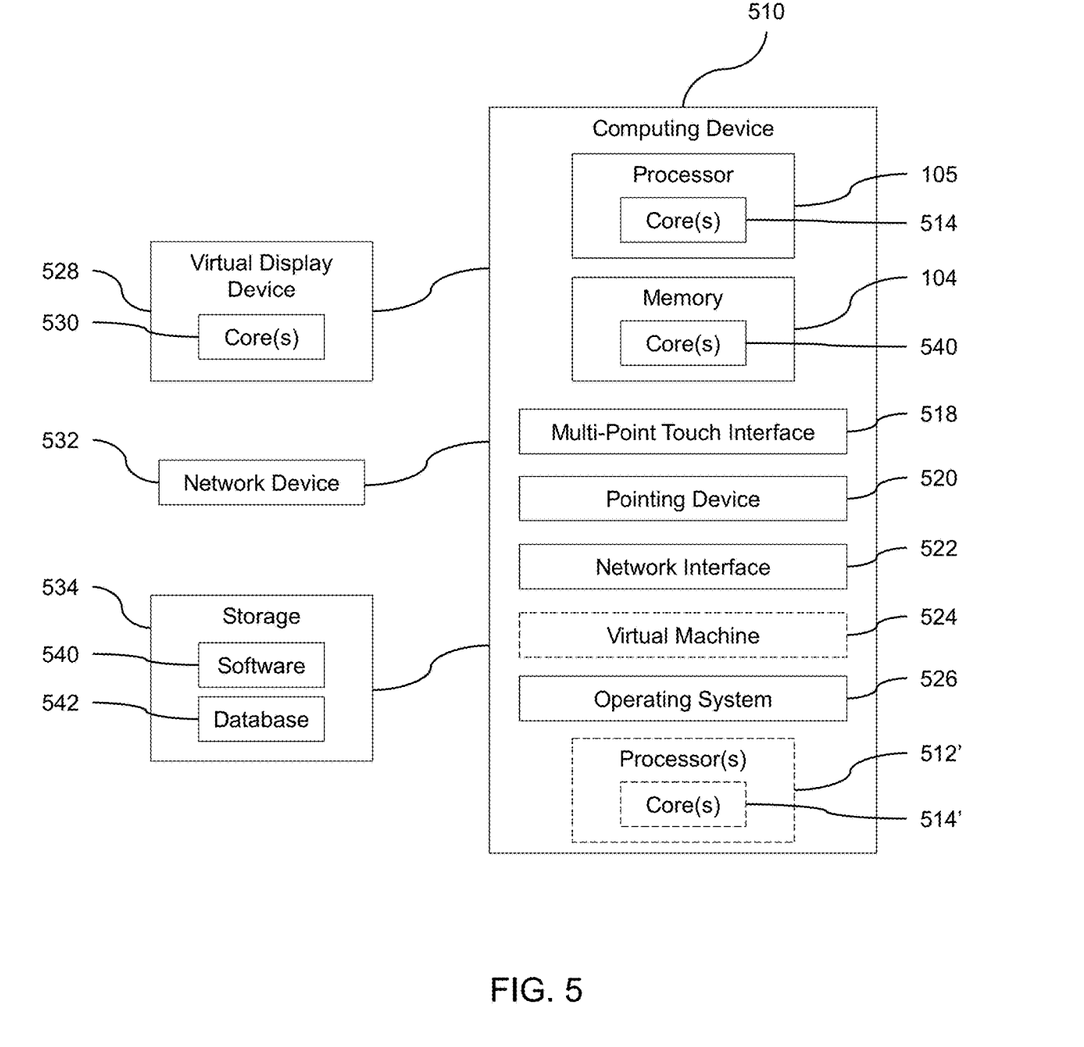
FIG. 5 is a block diagram of an exemplary computational device with various components which can be used to implement various embodiments.

FIG. 5 is a block diagram of an exemplary computing device 510 such as can be used, or portions thereof, in accordance with various embodiments and, for clarity, refers back to and provides greater detail regarding various elements of the system 100 of FIG. 1. The computing device 510, which can be, but is not limited to the central computing system, the server, user mobile device, POS device and data capture devices described herein, can include one or more non-transitory computer-readable media for storing one or more computer-executable instructions or software for implementing exemplary embodiments. The non-transitory computer-readable media can include, but is not limited to, one or more types of hardware memory, non-transitory tangible media (for example, one or more magnetic storage disks, one or more optical disks, one or more flash drives), and the like. For example, memory 104 included in the computing device 510 can store computer-readable and computer-executable instructions or software for performing the operations disclosed herein. For example, the memory 104 can store a software application 540 which is configured to perform the disclosed operations (e.g., manage yard vehicles in a distribution center). The computing device 510 can also include configurable and/or programmable processor 105 and an associated core 514, and optionally, one or more additional configurable and/or programmable processing devices, e.g., processor(s) 512' and associated core(s) 514' (for example, in the case of computational devices having multiple processors/cores), for executing computer-readable and computer-executable instructions or software stored in the memory 104 and other programs for controlling system hardware. Processor 105 and processor(s) 512' can each be a single core processor or multiple core (514 and 514') processor.

Virtualization can be employed in the computing device 510 so that infrastructure and resources in the computing device can be shared dynamically. A virtual machine 524 can be provided to handle a process running on multiple processors so that the process appears to be using only one computing resource rather than multiple computing resources. Multiple virtual machines can also be used with one processor.

Memory 104 can include a computational device memory or random access memory, such as DRAM, SRAM, EDO RAM, and the like. Memory 104 can include other types of memory as well, or combinations thereof.

A user can interact with the computing device 510 through a visual display device 528, such as any suitable device capable of rendering texts, graphics, and/or images including an LCD display, a plasma display, projected image (e.g. from a Pico projector), Google Glass, Oculus Rift, HoloLens, and the like, and which can display one or more user interfaces 530 that can be provided in accordance with exemplary embodiments. The computing device 510 can include other I/O devices for receiving input from a user, for example, a keyboard or any suitable multi-point touch (or gesture) interface 518, a pointing device 520 (e.g., a mouse). The keyboard 518 and the pointing device 520 can be coupled to the visual display device 528. The computing device 510 can include other suitable conventional I/O peripherals.

The computing device 510 can also include one or more storage devices 534, such as a hard-drive, CD-ROM, flash drive, or other computer readable media, for storing data and computer-readable instructions and/or software that perform operations disclosed herein. In some embodiments, the one or more storage devices 534 can be detachably coupled to the computing device 510. Exemplary storage device 534 can also store one or more software applications 540 for implementing processes of the load management system described herein and can include databases 542 for storing any suitable information required to implement exemplary embodiments. The databases can be updated manually or automatically at any suitable time to add, delete, and/or update one or more items in the databases. In some embodiments, at least one of the storage device 534 can be remote from the computing device (e.g., accessible through a communication network) and can be, for example, part of a cloud-based storage solution.

The computing device 510 can include a network interface 522 configured to interface via one or more network devices 532 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 522 can include a built-in network adapter, network interface card, PCMCIA network card, card bus network adapter, wireless network adapter, USB network adapter, modem or any other device suitable for interfacing the computing device 510 to any type of network capable of communication and performing the operations described herein. Moreover, the computing device 510 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 510 can run operating systems 526, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 526 can be run in native mode or emulated mode. In an exemplary embodiment, the operating system 526 can be run on one or more cloud machine instances.

Figure 6:
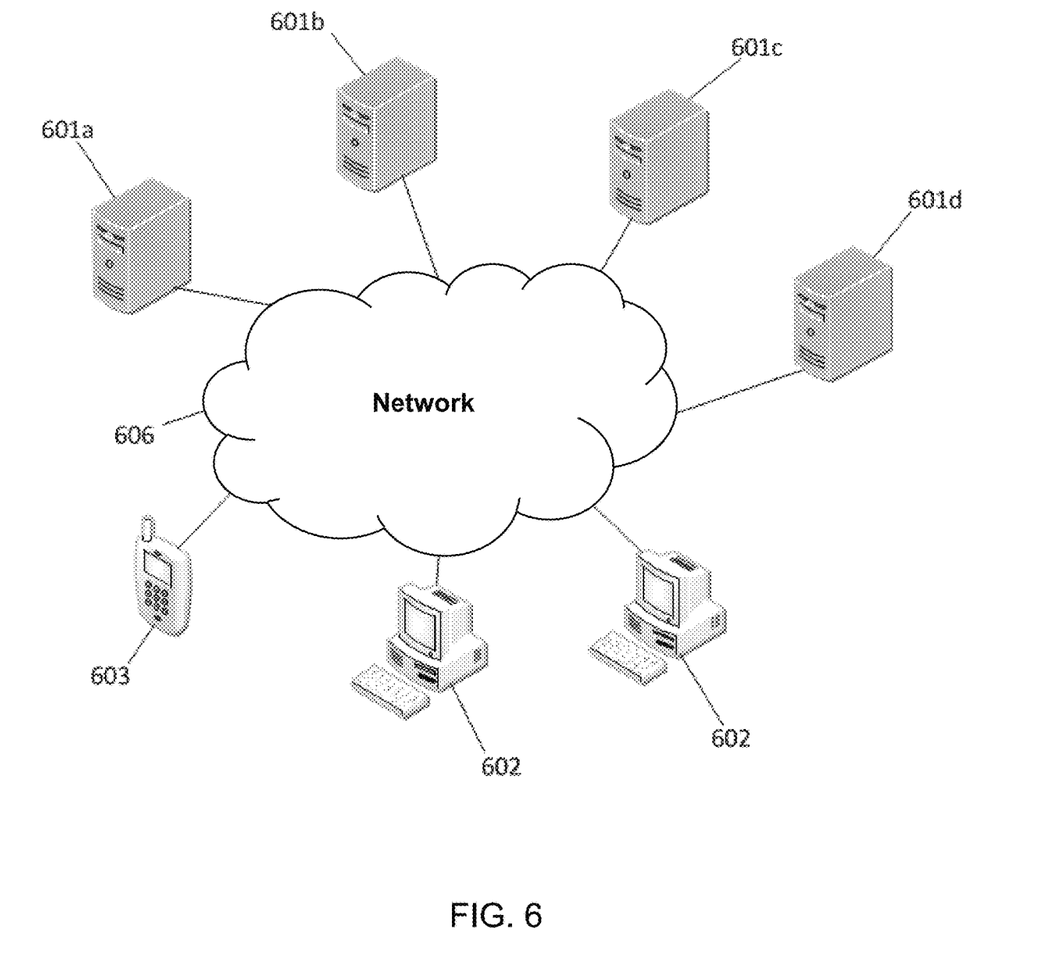
FIG. 6 is block diagram of an exemplary distributed system suitable for use in exemplary embodiments.

FIG. 6 is a block diagram of exemplary distributed and/or cloud-based embodiments. Although FIG. 1, and portions of the exemplary discussion above, make reference to a load management system 100 operating on a single computing device, one will recognize that various of the modules within the load management system 100 may instead be distributed across a network 606 in separate server systems 601*a*-*d* and/or in other computing devices, such as a desktop computer device 602, or mobile computer device 603. As another example, the user interface provided by the mobile application 123 can be a client side application of a client-server environment (e.g., a web browser or downloadable application, such as a mobile app), wherein the processing module 109 is hosted by one or more of the server systems 601*a*-*d* (e.g., in a cloud-based environment) and interacted with by the desktop computer device or mobile computer device. In some distributed systems, the modules of the system 100 can be separately located on server systems 601*a*-*d* and can be in communication with one another across the network 606.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with a multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A load management system for a distribution center, the system comprising:
a database storing load information related to a plurality of loads destined for the distribution center, the load information including an identification associated with each load in the plurality of loads;
a mobile application associated with a user account and executable on a mobile device, the mobile application including a main application and a plurality of independently executable sub-applications corresponding to workflow progresses in the distribution center, the mobile device executes the mobile application, and the mobile application when executed:
  accesses, in response to a user logging in to the main mobile application associated with the corresponding user account, the plurality of sub-applications, each of the main application and the plurality of sub-applications corresponding to separate and distinct executables and being executed as separate and distinct instances;
  renders, on a display of the mobile device and within a graphical user interface of the main application, selectable icons corresponding to the plurality of sub-applications on the mobile device;
  activates a first sub-application of the plurality of sub-applications in response to the user selecting a first one of the selectable icons corresponding to the first sub-application, the first sub-application when executed:
    acquires at least one of a plurality of identifications of the loads;
    queries the database, with the acquired at least one of the plurality of identifications of the loads, for the load information related to a specified load;
    receives the queried load information from the database;
    updates the load information based on information of load documentation; and
    generates a machine-readable representation corresponding to the at least one of the plurality of identifications of the load;
  activates a second sub-application of the plurality of sub-applications in response to the user selecting a second one of the selectable icons corresponding to the second sub-application, the second sub-application when executed:
    acquires the machine-readable representation generated by the first sub-application;
    queries the database, with the machine-readable representation, for the load information related to the load;
    receives the queried load information from the database;
    acquires pallet information; and
    updates the load information based on the pallet information,
  wherein the plurality of sub applications inherit credentials from the main application and communicate with each other in response to inheriting the credentials.

2. The system of claim 1, further comprising:
a computing system in communication with the mobile device and the database, the computing system configured to:

receive the updated load information from the first sub-application and the second sub-application;

transmit the updated load information to the database;

receive, from a client device at a gate of the distribution center, an image of the machine-readable representation scanned from the mobile device by the client device upon arrival of the cargo trailer at the gate;

extract the at least one of the plurality of identifications of the load from the scanned image;

render a map of the geographic area including a transfer location at which the cargo trailer is to be dropped off after passing through the gate; and transmit the map and a load status to the mobile device associated with the user account.

3. The system of claim 1, wherein the mobile application when executed, further activates a third sub-application of the plurality of sub-applications in response to the user selecting a third one of the selectable icons corresponding to the third sub-application, the third sub-application when executed:

acquires the machine-readable representation generated by the first sub-application;

queries the database, with the machine-readable representation, for the pallet information and the load information related to the load;

receives the pallet information and the load information from the database; and presents the pallet information and the load information on the mobile device.

4. The system of claim 1, wherein the mobile application and the plurality of sub-applications share the load information and the pallet information related to the load and share user profile associated with the user account.

5. The system of claim 1, wherein the user logs in to the mobile application using a federated login.

6. The system of claim 5, wherein the main mobile application provides security shell for the plurality of sub-applications based on principles of inherency and the federated login.

7. The system of claim 1, wherein when the mobile application is terminated, the plurality of sub-applications are terminated accordingly.

8. The system of claim 1, wherein each of the plurality of identifications of the loads include a delivery number, a load number, a purchase order (PO) number, and a bill of lading (BOL) number.

9. The system of claim 1, wherein the load information include driver information related to a driver delivering the cargo trailer to the distribution center, a vehicle transporting the cargo trailer, a freight-type associated with each of the plurality of loads, estimated time of arrival, trailer number, Standard Carrier Alpha Code (SCAC), seal number, and freight type.

10. The system of claim 1, wherein the load status includes a real-time status of unloading freight indicating estimated time to complete unloading.

11. The system of claim 1, wherein the computing system further verifies pallet information based on images of each pallet of the load scanned by the mobile device.

12. A computer-implemented method for remotely managing loads at a distribution center, comprising:

accessing, in response to a user logging in to a main mobile application included in a mobile application which is associated with a user account and executable on a mobile device, a plurality of sub-applications included in the mobile application, the plurality of sub-applications being independently executable and corresponding to workflow progresses in the distribution center, and each of the main application and the plurality of sub-applications corresponding to separate and distinct executables and being executed as separate and distinct instances;

rendering, on a display of the mobile device and within a graphical user interface of the main application, selectable icons corresponding to the plurality of sub-applications on the mobile device;

activating, by the mobile application, a first sub-application of the plurality of sub-applications in response to the user selecting a first one of the selectable icons corresponding to the first sub-application, and executing the first sub-application, the process of executing the first sub-application comprising:

acquiring at least one of a plurality of identifications of the loads;

querying a database, with the acquired at least one of the plurality of identifications of the loads, for load information related to a specified load, the database holding the load information related to a plurality of loads stored in a cargo trailer destined for the distribution center, and the load information including an identification associated with each load in the plurality of loads;

receiving the queried load information from the database;

updating the load information based on information of load documentation; and generating a machine-readable representation corresponding to the at least one of the plurality of identifications of the load;

activating, by the mobile application, a second sub-application of the plurality of sub-applications in response to the user selecting a second one of the selectable icons corresponding to the second sub-application, and executing the second sub-application, the process of executing the second sub-application comprising:

acquiring the machine-readable representation generated by the first sub-application;

querying the database, with the machine-readable representation, for the load information related to the load;

receiving the queried load information from the database;

acquiring pallet information; and updating the load information based on the pallet information, wherein the plurality of sub applications inherit credentials from the main application and communicate with each other in response to inheriting the credentials.

13. The method of claim 12, further comprising receiving, by a computing system in communication with the mobile device and the database, the updated load information from the first sub-application and the second sub-application;

transmitting, by the computing system, the updated load information to the database;

receiving, by the computing system, from a client device at a gate of the distribution center, an image of the machine-readable representation scanned from the mobile device by the client device upon arrival of the cargo trailer at the gate;

extracting, by the computing system, the at least one of the plurality of identifications of the load from the scanned image;

rendering, by the computing system, a map of the geographic area including a transfer location at which the cargo trailer is to be dropped off after passing through the gate; and transmitting, by the computing system, the map and a load status to the mobile device associated with the user account.

14. The method of claim 12, further comprising activating a third sub-application of the plurality of sub-applications in response to the user selecting a third one of the selectable icons corresponding to the third sub-application, and executing the third sub-application, the process of executing the third sub-application comprising:

acquiring the machine-readable representation generated by the first sub-application;

querying the database, with the machine-readable representation, for the pallet information and the load information related to the load;

receiving the pallet information and the load information from the database; and presenting the pallet information and the load information on the mobile device.

15. The method of claim 12, further comprising sharing, between the mobile application and the plurality of sub-applications, the load information and the pallet information related to the load, and user profile associated with the user account.

16. The method of claim 12, further comprising logging in to the mobile application using a federated login.

17. The method of claim 16, further comprising providing, by the main application, security shell for the plurality of sub-applications based on principles of inherency and the federated login.

18. The method of claim 12, further comprising when the mobile application is terminated, terminating the plurality of sub-applications accordingly.

19. The method of claim 12, wherein each of the plurality of identifications of the loads include a delivery number, a load number, a purchase order (PO) number, and a bill of lading (BOL) number.

20. The method of claim 12, wherein the load information include driver information related to a driver delivering the cargo trailer to the distribution center, a vehicle transporting the cargo trailer, a freight-type associated with each of the plurality of loads, estimated time of arrival, trailer number, Standard Carrier Alpha Code (SCAC), seal number, and freight type.

21. The method of claim 12, wherein the load status includes a real-time status of unloading freight indicating estimated time to complete unloading.

22. The method of claim 12, further comprising verifying, by the computing system, pallet information based on images of each pallet of the load scanned by the mobile device.

* * * * *